United States Patent [19]

Inazawa et al.

[11] Patent Number: 5,081,548
[45] Date of Patent: Jan. 14, 1992

[54] DATA STORAGE APPARATUS AND METHOD

[75] Inventors: Yoshizumi Inazawa, Yokohama, Japan; Brian A. Milthorp, Cotham, England

[73] Assignees: Hewlett-Packard Ltd., Berkshire, England; Sony Corporation, Tokyo, Japan

[21] Appl. No.: 485,239

[22] Filed: Feb. 26, 1990

[30] Foreign Application Priority Data

Mar. 9, 1989 [GB] United Kingdom ................ 8905435

[51] Int. Cl.$^5$ ...................... G11B 15/18; G11B 17/00; G11B 12/02
[52] U.S. Cl. .................................................. 360/72.2
[58] Field of Search ............... 360/72.2, 69, 71, 48–49

[56] References Cited

U.S. PATENT DOCUMENTS 4,837,640  6/1989  Ozaki ................................ 360/72.2

Primary Examiner—A. J. Heinz
Attorney, Agent, or Firm—Woodcock Washburn Kurtz Mackiewicz & Norris

[57] ABSTRACT

Data storage apparatus is known in which data is stored on a tape medium in at least two different longitudinally spaced sections (Partitions I and 0) with data recordal in each section being effected in accordance with a predetermined format. This format will generally be of the type in which tape-usage information is recorded in a system log (82) located upstream of the main data area (37). It is also known to record tape usage information relating to each tape section (Partition 1,0) in the system log (82) of that section. The present apparatus provides not only for the recording of usage information from which section-specific information can be derived, but also for the recording of aggregated tape usage information. This latter information is stored in the system log (82) of the first tape section (Partition 1) so as to be readily accessible upon tape loading.

11 Claims, 4 Drawing Sheets

DATA STORAGE APPARATUS AND METHOD

BACKGROUND OF THE INVENTION

The present invention relates to data storage apparatus for storing data on a tape medium. More particularly the present invention relates to the storage of tape-usage information in the system-log areas of multi-partition tapes.

The use of a system log area to record tape-usage information on a storage tape is well-known (see, for example, the document "DAT DATA Storage Format Description," Revision A.00, dated February 1988 and generally available as of that date from Hewlett-Packard Limited, Bristol, England).

A multi-partition tape is one in which data is independently recorded in two or more sections (Partitions) of the tape, the data being recorded in each section according to the same predetermined format. Such a multi-partition tape forms the subject of our co-pending U.S. Pat. Application Ser. No. 07/442,545, filed Nov. 28, 1989.

The application of the concept of a system log area to multi-partition tapes is referred to in the aforesaid United States patent application and is described more fully in the document Digital Data Storage Format Description" dated October, 1988 and generally available as of December 1988 from Hewlett-Packard Limited, Bristol, England. More particularly, data storage apparatus is envisaged of the general form comprising:

recording means for recording data on a tape medium in accordance with a predetermined format, the format specifying a plurality of tape recording sections arranged one after another along the tape medium and including a log area for storing tape usage information and a data area for storing the data, and control means operative to cause the recording means to record data in at least two different longitudinally-spaced sections of the tape medium with data recordal in each section being respectively effected in accordance with the format, the recording means including a tape-usage monitor operative to accumulate tape-usage information relating to data recordal on the tape medium, the form of the accumulated tape usage information being such as to enable tape-usage information relating to each said tape section to be derived therefrom, the recording means being operative to record the accumulated tape-usage information in the said log areas associated with the said tape sections. In the arrangement disclosed in the aforesaid format Description, the tape usage information recorded in the log area of each tape section (Partition) relates solely to data recordal in that section.

Although both the aforesaid United States patent Application and Format Description describe format implementations specifically intended for helical scan recording techniques, the general principles disclosed regarding the use of system log areas in multi-partition tapes apply also where other recording techniques are employed.

SUMMARY OF THE INVENTION

It has now been recognized by the Applicants that the foregoing arrangement has a potential drawback in that in order to derive tape usage information in respect to a recorded tape in its entirety, it is necessary to read the tape usage information recorded in the log area of each tape section; such an operation can take a significant amount of time.

To overcome this potential drawback, the data storage apparatus and method of the above general form is now proposed, in which in accordance with the present invention, the tape-usage monitor is arranged to accumulate, as part of said accumulated tape-usage information, aggregated data formed by aggregating tape-usage information across all said tape sections, the recording means being operative to record the aggregated data in the log area of the first tape section encountered from the beginning of the tape. This arrangement facilitates access to tape usage information relating to use of the tape as a whole.

In order to provide for the recovery of tape-usage information specific to each tape section, the accumulated tape-usage information comprises, in addition to said aggregated data, respective section-usage data relating specifically to at least one tape section downstream of the first section, the recording means being operative to record the section-usage data relating to a specific tape section in the log area of that tape section.

Alternatively said accumulated tape-usage information may comprise in addition to said aggregated data, respective subtotal data associated with at least one each tape section downstream of the first section, this data being formed for a particular section by aggregating the tape usage information relating to that section with tape usage information of each downstream tape section, the recording means being operative to record the subtotal data associated with a particular tape section in the log area of that tape section.

Generally, the data storage apparatus will also comprise readback means for reading back data and tape-usage information recorded in said medium in accordance with the predetermined format, the control means being operative to control the readback means to read back data and tape usage information from each section of the tape as required. The readback means enables tape-usage information to be accumulated across tape usage sessions by appending new usage data to that read from the tape at the beginning of a tape-usage session.

According to a preferred embodiment of the present invention, where the data storage apparatus is provided with readback means, the apparatus is further provided with a tape-usage interpreter operative to receive tape-usage information read back from the tape medium by the readback means, and to derive therefrom tape-usage information relating specifically to each said tape section, including the first section.

DESCRIPTION OF THE DRAWINGS

A data storage apparatus embodying the invention will now be particularly described, by way of nonlimiting example, with reference to the accompanying diagrammatic drawings, in which.

DETAILED DESCRIPTION OF THE PREFERRED EMBODIMENT

The data storage apparatus now to be described utilizes a helical scan technique for storing data in pairs of oblique tracks (frames) on a recording tape in a frame format similar to that used for the storage of PCM audio data according to the DAT Conference Standard (June 1987), Electronic Industries associated of Japan, Tokyo, Japan). The present apparatus is, however, adapted for storing computer data rather than digitized audio information. More particularly, the present apparatus implements the two-partition format described in "Digital Data Storage Format Description" document dated October 1988 as of December 1988 available from Hewlett-Packard Ltd, Bristol, England and Sony Corporation, Tokyo, Japan.

Figure 1:
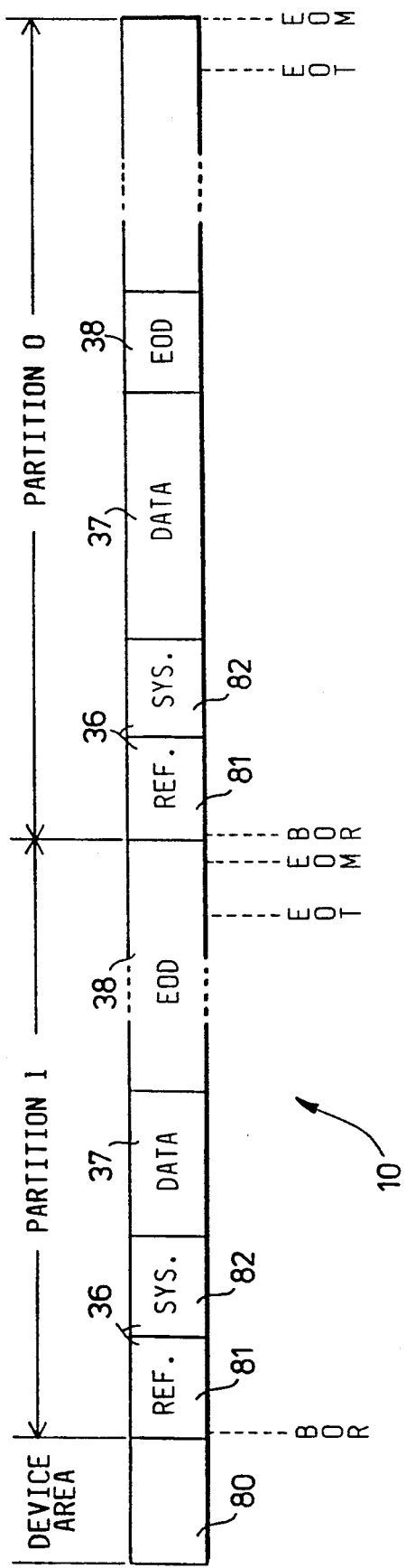
FIG. 1 is a diagram showing the overall layout of a tape recorded using the present apparatus.

FIG. 1 shows the overall layout of a two-partition tape 10, that is, a tape which has two separate areas for recording data independently. These two areas are referred to herein as Partition 1 and Partition 0, the latter being by convention, furthest from the start of the tape. In the present example, as well as Partitions 1 and 0, there is an initial area of the tape, referred to as the device area 80, Which is set aside for loading and testing of the tape 10.

Each Partition 1 and 0 is used independently to record data according to a recording format which is complete in itself (that is, so far as data recordal in one Partition is concerned, the existence of the other Partition is irrelevant) The nature of the data recorded in the two Partitions is not relevant to the present invention, but may for example be constituted by data files in Partition 0 and a directory of these files in Partition 1.

FIG. 1 also illustrates the recording format used in each Partition 1 and 0. Within each Partition, the tape is organized into three main areas, namely a lead-in area 36, a data area 37 and an end-of-data (EOD) area 38. User data is recorded in the data area 37. The lead-in area 36 includes a system log area 82 for storing tape usage information, and a reference area 81 that precedes the system area 82 and serves as a reference for updating the latter.

Further according to the recording format used in each Partition, three tape positions are defined, namely Beginning-Of-Recording (BOR), End-Of-Tape (EOT) and End-Of-Media (EOM). BOR marks the beginning of each Partition, while EOT and EOM respectively mark the approach, and the occurrence, of the end of the recording for each Partition. EOT and EOM for Partition 1 and BOR for Partition 0 are synthetic inasmuch as the conditions indicated are not true beginning and end of tape/media marks as their name might suggest.

The extent of Partition 1 is predetermined and cannot be exceeded when recording data in Partition 1; this is necessary to avoid overwriting Partition 0. As will be described below, in the present embodiment the tape is written to in frames and these frames are numbered consecutively starting afresh within each Partition. The extent of Partition 1 is determined in terms of a set number of frames. When a tape is first loaded, it is formatted by writing the reference, system, and EOD areas of both Partitions; however, the EOD area of Partition 1 is extended up to the maximum frame count predetermined for Partition 1 while the EOD area of Partition 1 is of fixed extent (typically 300 frames). By monitoring the frame number, within Partition 1, the EOT and EOM positions can be readily detected, these being set in terms of respective numbers of frames preceding the end of Partition 1 (which is at a known frame count) As data is recorded in Partition 1, the EOD area is reduced until the capacity of Partition 1 has been reached. In Partition 0, an EOD of fixed extent is written after new data has been added up to the capacity of the Partition.

Although FIG. 1 only illustrates two Partitions along the length of the tape 10, it is of course possible to provide three or more Partitions each having the same recording format as Partition 1 and 0 of FIG. 1.

Having described the general recording layout implemented by the present apparatus, a description will now be given of the frame format utilized by the present apparatus after first outlining the basic components of a helical scan tape deck such as used by the present apparatus.

Figure 2:
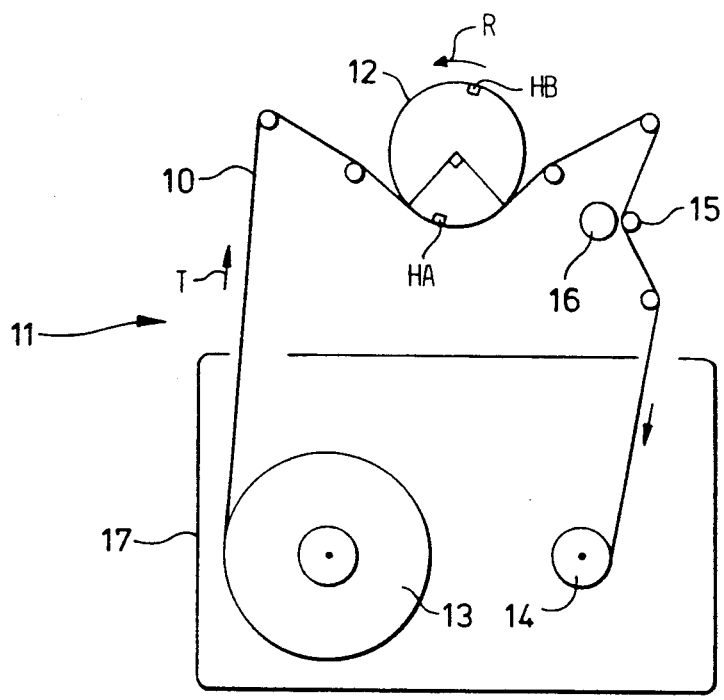
FIG. 2 is a diagram illustrating the main physical components of a helical-scan tape deck of the present apparatus.
Figure 3:
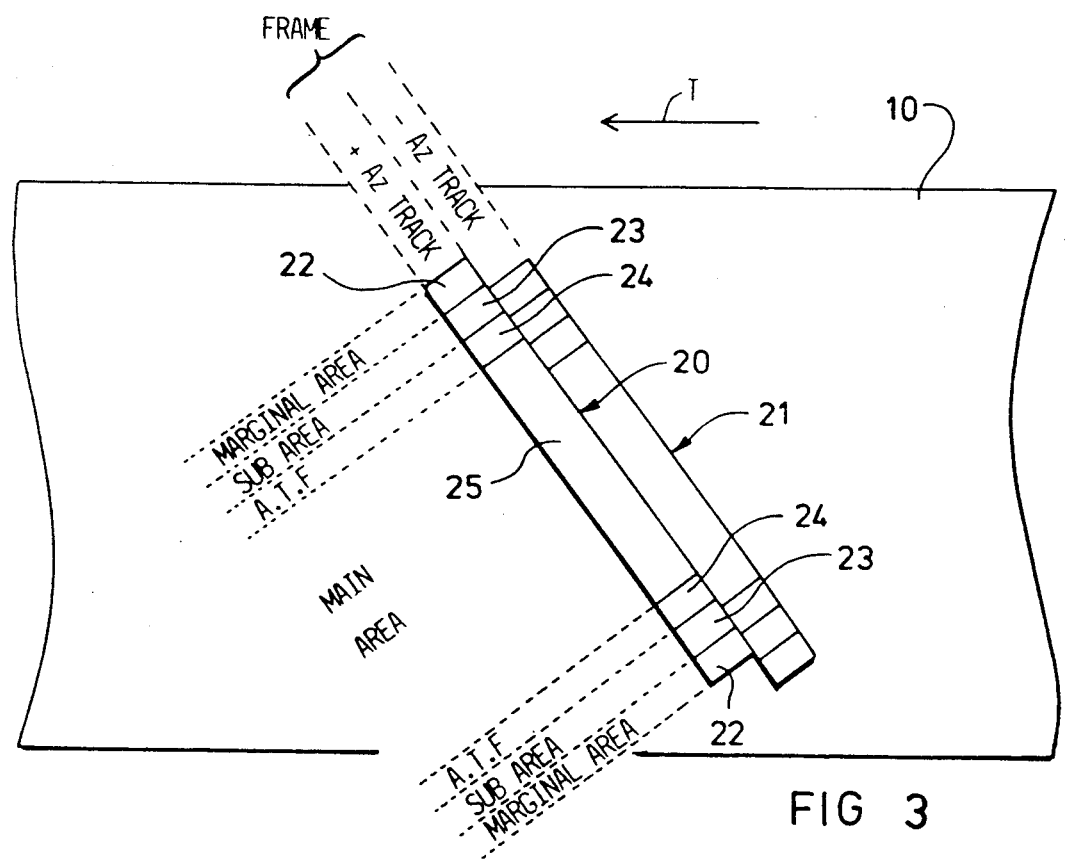
FIG. 3 is a diagrammatic representation of two data tracks recorded on a tape using helical scanning.

FIG. 2 shows the basic layout of a helical-scan tape deck 11 in which tape 10 from a tape cartridge 17 passes at a predetermined angle across a rotary head drum 12 with a wrap angle of 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180 degrees. In known manner, these heads HA, HB are arranged to write overlapping oblique tracks 20, 21 respectively across the tape 10 as shown in FIG. 3. The track written by head HA has a positive azimuth while that written by head HB has a negative azimuth. Each pair of positive and negative azimuth tracks, 20, 21 constitutes a frame.

The basic format of each track is arranged to be written by the present apparatus as illustrated in FIG. 3. Each track Comprises two marginal areas 22, two sub areas 23, two ATF (Automatic Track Following) areas 24, and a main area 25. The ATF areas 24 provide signals enabling the heads HA, HB to accurately follow the tracks in known manner. The main area 25 is used primarily to store the data provided to the apparatus (user data) although certain auxiliary information is also stored in this area; the sub areas 23 are primarily used to store further auxiliary information. The items of auxiliary information stored in the main and sub areas are known as sub codes and relate, for example, to the logical organization of the user data, its mapping onto the tape, certain recording parameters (such as format identity, tape parameters, etc.) and tape usage history.

A more detailed description of the main area 25 and sub areas 23 will now be given including details as to block size that are compatible with the aforementioned DAT Conference Standard.

Figure 4:
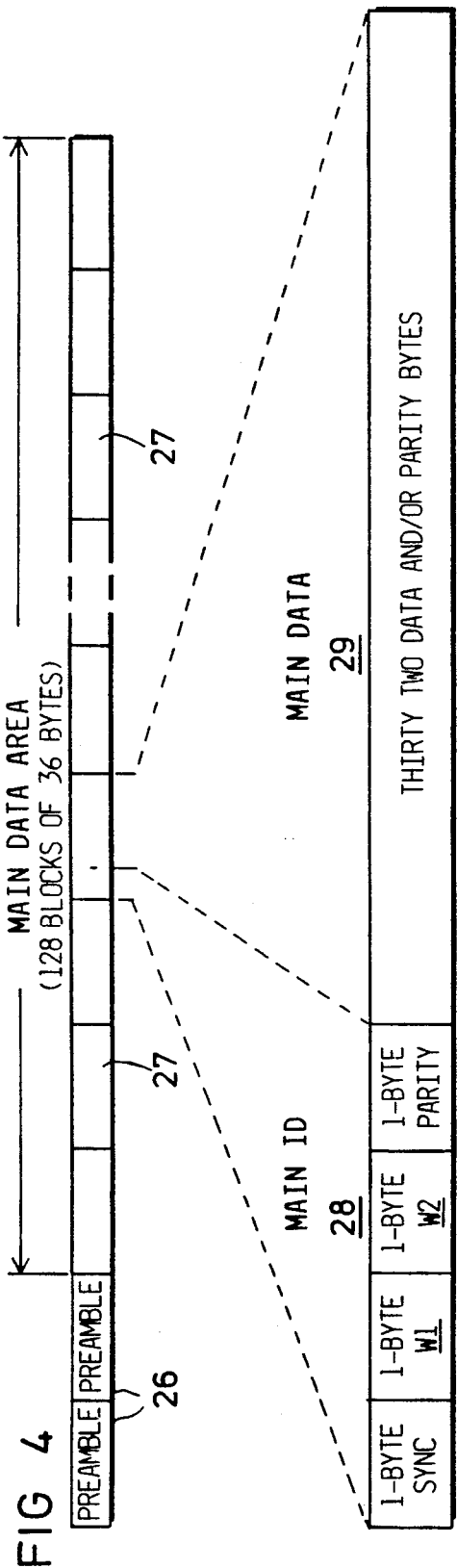
FIG. 4 is a diagrammatic representation of the format of a main data area of a data track.

The data format of the main area 25 of a track is illustrated in FIG. 4. The main area is composed of 130 blocks each thirty-six bytes long. The first two blocks 26 are preambles which contain timing data patterns to facilitate timing synchronization on playback. The remaining 128 blocks 27 make up the 'Main Data Area'. Each block 27 of the Main Data Area comprises a four-byte 'Main ID' region 28 and a thirty-two byte 'Main Data' region 29 the compositions of which are shown in the lower part of FIG. 4.

The Main ID region 28 is composed of a sync byte, two information-containing bytes W1, W2 and a parity byte. Byte W2 is used for storing information relating to the block as a whole (type and address) while byte W1 is used for storing sub codes.

The Main Data region 29 of each block 27 is composed of thirty-two bytes generally constituted by user-data and/or user-data parity. However, it is also possible to store sub codes in the Main Data region if desired.

Figure 5:
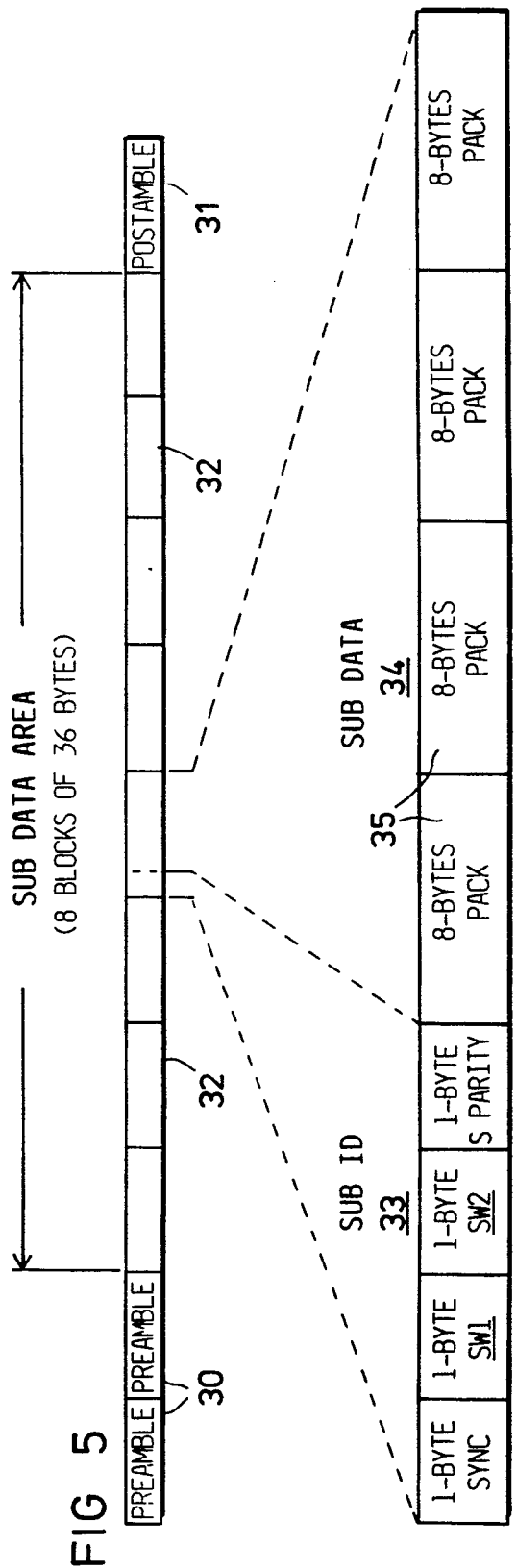
FIG. 5 is a diagrammatic representation of the format of a sub data area of a data track.

The data format of each sub area 23 shown in FIG. 3 of a track is illustrated in FIG. 5. The sub area is composed of eleven blocks each thirty-six bytes long. The first two blocks 30 are preambles while the last block 31 is a post-amble. The remaining eight blocks 32 make up the "Sub Data Area". Each block 32 comprises a four-byte 'Sub ID' region 33 and a thirty-two byte 'Sub Data' region 34, the compositions of which are shown in the lower part of FIG. 5.

The Sub ID region 33 is composed of a sync byte, two information-containing bytes SW1, SW2 and a parity byte. Byte SW2 is used for storing information relating to the block as a whole (type and address) and the arrangement of the Sub Data region 34. Byte SW1 is used for storing sub codes.

The Sub Data region 34 of each block 32 is composed of thirty-two bytes arranged into four eight-byte "packs" 35. These packs 35 are used for storing sub-codes with the types of sub code stored being indicated by a pack-type label that occupies the first half byte of each pack. The fourth pack 35 of every second block is used to store parity check data both for the first three packs of that block and the four packs of the preceding block.

In summary, user data is stored in the Main Data regions 29 of the Main Data Area blocks 27 of each track while sub codes can be stored both in the Sub ID and Sub Data regions 33, 34 of Sub Data Area blocks 32 and in the Main ID and the Main Data regions 28, 29 of Main Data Area blocks 27.

For the purposes of the present description, the sub codes of interest are:
1. (a) Partition ID Sub Code used to identify the current Partition;
   (b) Area 1D sub code used to identify the Current tape Area;
2. (a) Absolute Frame Count (AFC) sub-code used to number each frame from the BOR position of the current Partition;
   (b) AFC Maximum sub-code used to indicate the maximum number of frames for the Current Partition; and
3. Tape usage sub-codes for storing tape usage data.

The Partition ID sub-code and the area ID sub code together form a four-bit code stored in byte SW1 of the Sub ID region 33 of every even Sub Data Area block 32 recorded in every track of all tape areas 36 to 38.

The AFC sub code is, for example, a three-byte code stored in the third pack 35 of the Sub Data region 34 of every block recorded in the Sub Data Area of every track of all tape areas 36 to 38. The AFC Max sub code is, for example, a three byte code stored in the third pack 35 of the Sub Data region 34 of every even block recorded in the Sub Data Area of every track of the system log areas 82.

The tape usage sub codes contain data indicative of, for example, the number of frames containing user data read and written both during the life of the tape to date and during the last session of use, and the number of tape usage sessions to date (one session being typically delimited by the loading and unloading of a tape cartridge) These tape usage sub codes are, for example, stored in the first two packs 35 of the Sub Data region 34 of the blocks in the Data Areas of every track of the system log areas 82. The tape usage sub codes are arranged to be repeated in their totality in the Sub Area of each track in the log area. However, the tape sub codes may not be repeated in every Sub Data Area block as they may require more than one block to store them. Thus, for example, the tape usage sub codes may occupy four packs in total in which case half the tape usage sub codes ar repeated every even block and the other half ar repeated every odd block.

According to the preferred embodiment of the present invention, the data stored in the tape usage sub codes recorded in the system area of Partition 1 (that is, the first Partition on the tape) is aggregated data relating to both Partitions while that stored in the System area of Partition 0 relates only to Partition 0. Thus, the system log area of Partition 1 may, for example, record a sub code giving the total number of frames read from both Partitions during the last session of use; the corresponding sub code recorded in the system area of Partition 0 will however, only give the number of frames read from Partition 0 during the last session of use. The number of frames read from Partition 1 during the last session of use can, of course, be recovered by subtracting the numbers given in the relevant sub codes of Partition 1 and 0.

In the present apparatus, the frames of the data area are arranged in groups each of a fixed number of frames (for example, twenty-two) optionally, these groups are separated from each other by one or more amble frames of predetermined content. The organization of user data into such groups has no relation to the logical structure of the user data and information relating to this structure (for example, record and file marks) is stored in an index that terminates the user-data in a group (the index actually occupies user data space within the group). Information regarding logical structure may also be stored in sub codes as may other group-dependent items of information. The arrangement of frames into groups and the logical structure of data within these groups is not relevant to the present invention and will therefore not be further elaborated upon herein.

Figure 6:
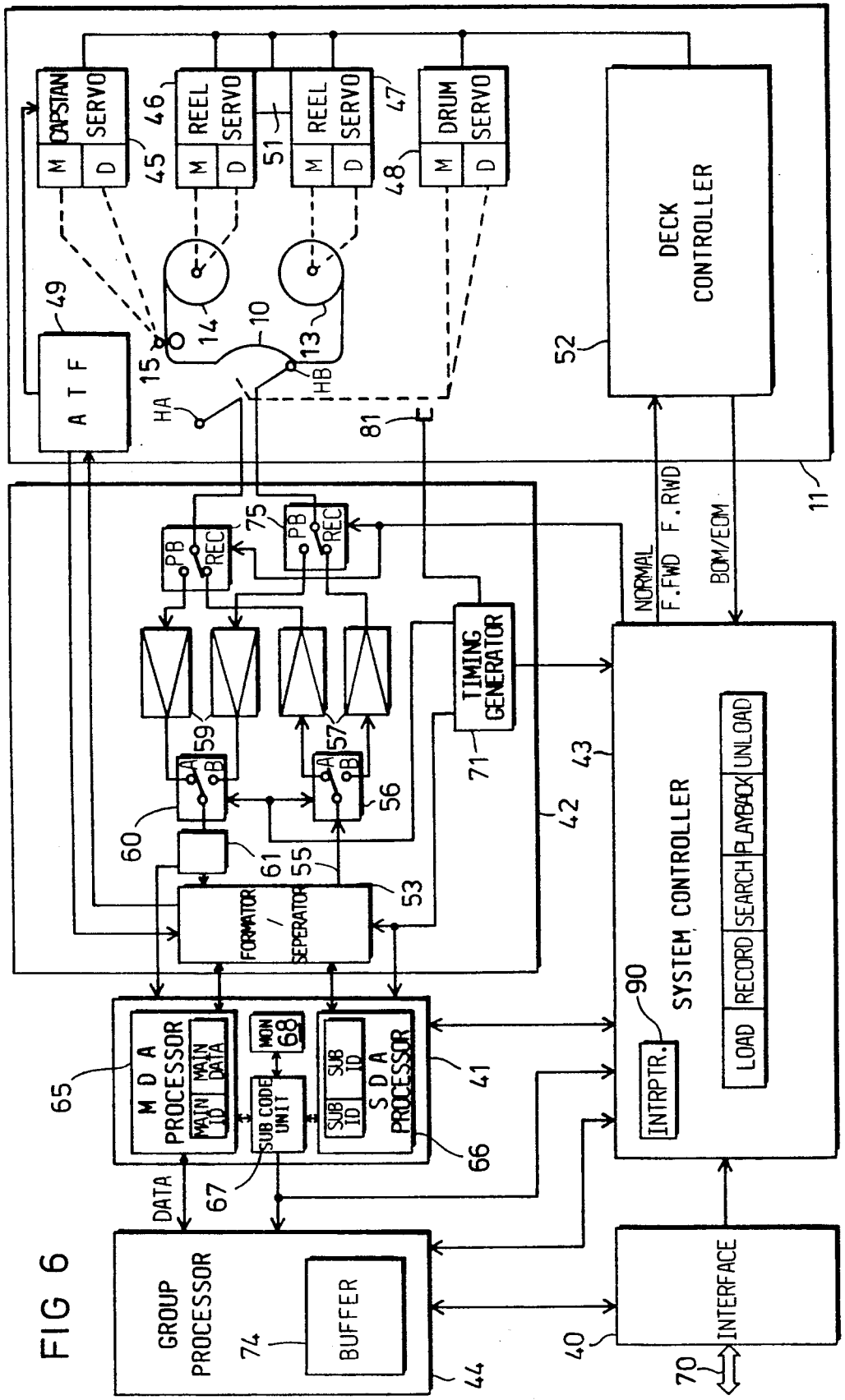
FIG. 6 is a block diagram of the main components of the data storage apparatus.

FIG. 6 is a block diagram of the data storage apparatus in its entirety including the tape deck 11 already described in part with reference to FIG. 2. In addition to the tape deck, the apparatus includes an interface unit 40 for interfacing the apparatus with a computer (not shown) a group processor 44 and a frame data processor 41 for processing user-data and sub codes into and out of Main Data Area and Sub Data Area blocks 27 and 32; a signal organizer 42 for composing/decomposing the signals for writing/reading a track and for appropriate switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The commands issued by the host computer are first received by the interface unit 40 which passe them onto the system controller 43; in due course the controller 43 will send a response back to the computer via the unit 40 indicating compliance or otherwise with the original command. Once the apparatus has been set up by the system controller 43 in response to a command from the computer to store or read data, then the interface unit 40 will also control the passage of data records and logical data segmentation marks between the computer and the group processor 44.

The function of the system controller 43 is to coordinate the operation of the data processing portions of the apparatus (processors 41, 44 and signal organizer 42) with the operation of the deck 11 in carrying out the commands received from the computer. In particular, the system controller 43 is responsible for implementing the Partition and tape-area format features shown in FIG. 1 and for ensuring that data is correctly read/written from the tape in accordance with these format features. Accordingly the system controller 43 is operative:

a) to initialize a blank tape upon loading by controlling the writing of reference, system and EOD areas 36, 37 and 38 for Partitions 1 and 0 with the EOD area of Partition 1 having a number of frames set by the maximum frame count for Partition 1 as determined by the host computer;

b) to read/write tape usage information to the system log areas 36 of Partitions 1 and 0;

c) to keep track of the current Partition and current tape area and to recognize and comply with the Partition limits (as defined by AFC Max) and the EDT and EOM marks; and d) to position the tape for reading/writing data and to thereafter coordinate the apparatus in carrying out the desired reading/writing operations; with respect to positioning the tape for reading, the system controller is operative to interpret search commands expressed in terms of record and file marks by utilizing the index data stored in each group to map the search request onto the physical data storage format.

During data storage the group processor 74 is arranged to segment the user-data provided to it in the form of data records into data packages each corresponding to a group's worth of data. This segmentation is effected without regard to the logical organization of the data (that is how it is divided into records). Information regarding the logical segmentation of the data (record divisions, file marks) is stored in an index which is generated by the processor 74 and which, as already mentioned, forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, 5 three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of user data at a time together with the appropriate sub codes. However, in order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

As previously mentioned, it may be desirable to insert one or more amble frames between groups of frames recorded on the tape. This can be done by arranging for the frame data processor 41 to generate such amble frames either upon instruction from the group processor 44 or automatically at the end of a group if the processor 41 is aware of group structure.

When data is being read from tape, the group processor 44 is arranged to receive user-data on a frame-by-frame basis, the data being written into the buffer 74 in such a manner as to build up a group. The group processor 44 can then access the group index to recover information on the logical organization (record structure, file marks) of the user-data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the main data region of the first block in the Main Data Area of each track of a frame. The sub code is used on playback to determine where the related frame data is placed in the buffer 74 when passed to the group processor 44.

The frame data processor 41 functionally comprises a Main-Data-Area (MDA) processor 65, a Sub-Data-Area (SDA) processor 66, and a sub code unit 67 with an associated tape-usage monitor 68 for storing tape usage data (in practice, these functional elements may be constituted by a single microprocessor running appropriate processes).

The sub code unit 67 is arranged to provide sub codes to the processors 65 and 66 as required during recording and to receive and distribute sub codes from the processors 65, 66 during playback. Dependent on their information contents, sub codes may be generated/required by the group processor 44 or the system controller; the Partition ID sub code and the Area ID sub code are, for example, determined by/used by the controller 43. In the case of non-varying sub codes such as certain recording parameters, the sub codes may be permanently stored in the unit 67. Furthermore, frame-dependent sub codes such as absolute frame number, may conveniently be generated by the sub code unit 67 itself. The AFC Max sub code will initially be determined by the host computer and passed via the interface 70 to the system controller 43 for use in initiating the Partitions and for onward transmission to the sub code unit 67 for subsequent recording.

With regard to the tape usage sub codes, those stored in the system area of Partition 1 (that is, those relating to aggregated data) are read off upon first loading of a tape and stored by the unit 67 in the tape usage monitor 68. The tape-usage sub codes stored in the system area of Partition 0 will also be read off and stored in the memory 68 of the unit 67, the first time that Partition 0 is accessed in a session of use.

During a tape usage session, the tape usage data held in the monitor 68 is updated by the unit 67 as appropriate on the basis of inputs received from the processors 44, 65, 66 and the controller 43; thus if a record is kept of the number of user-data frames read/written (either directly or in terms of the number of groups read and written), then this data must be continually updated via the unit 67 as a result of inputs from the processor 65 (or possibly the processor 44 if groups are counted) The tape-usage data read back from Partition 1 is updated in respect of reading/writing taking place in both Partitions while the tape-usage read back from Partition 0 is only updated in respect of reading/writing taking place in Partition 0.

At the end of a tape usage session, the two sets of tape-usage data held in the monitor 68 are stored to tape in the Sub Areas of each track within the system Log Area of the tape system area, the aggregated data being stored to Partition 1 and the data relevant to Partition 0 being stored in that Partition.

A suitable procedure for effecting an update-in-place of the system areas 82 is described in the aforesaid Format Description to which the reader is directed for details.

The MDA processor 65 is arranged to process a frame's worth of user data at a time together with any relevant sub codes. Thus during recording, the processor 65 receives a frame's worth of user-data from the group processor 44 together with sub codes from the unit 67. On receiving the user-data the processor 65 interleaves the data, and calculates error correcting codes, before assembling the resultant data and sub codes to output the Main-Data-Area blocks for the two tracks making up a frame. In fact before assembling the user data with the sub codes, scrambling (randomizing) of the data may be effected to ensure a consistent RF envelope independent of the data contents of a track signal.

During playback, the processor 65 effects a reverse process on the two sets of Main-Data-Area blocks associated with the same frame. Unscrambled, error-corrected and de-interleaved user data is passed to the group processor 44 and sub codes are separated off and distributed by the unit 67 to the processor 44 or system controller 43 as required.

The operation of the SDA processor 66 is similar to the processor 65 except that it operates on the sub codes associated with the sub-data-areas of a track, composing and decomposing these sub codes into and from Sub-Data-Area blocks.

The signal organizer 42 comprises a formatter/separator unit 53 which during recording (data writing) is arranged to assemble Main-Data-Area blocks and Sub-Data-Area blocks provided by the frame data processor 41 together with ATF signals from an ATF circuit 49, to form the signal to be recorded on each successive track. The necessary pre-amble and post-amble patterns are also inserted into the track signals where necessary by the unit 53. Timing signals for coordinating the operation of the unit 53 with rotation of the heads HA, HB are provided by a timing generator 54 fed with the output of pulse generator 50 responsive to head drum rotation. The track signals output on line 55 from the unit 53 are passed alternately to head HA and head HB via a head switch 56, respective head drive amplifiers 57, and record/playback switches 58 set to their record positions. The head switch 56 is operated by appropriately timed signals from the timing generator 54.

During playback (data reading) the track signals alternately generated by the heads HA and HB are fed via the record/playback switches 58 (now set in their playback positions), respective read amplifiers 59, a second head switch 60, and a clock recovery circuit 61, to the input of the formatter/separator unit 53. The operation of the head switch 60 is controlled in the same manner as that of the head switch 56. The unit 53 no serves to separate off the ATF signals and feed them to the circuit 49, and to pass the Main-Data-Area blocks and Sub-Data-Area blocks to the frame data processor 41. Clock signals are also passed to the processor 41 from the clock recovery circuit 61. The switches 58 are controlled by the system controller 43.

The tape deck 11 comprises four servos, namely a capstan servo 45 for controlling the rotation of the capstan 15, first and second reel servos 46, 47 for controlling rotation of the reels 14, 15 respectively, and a drum servo 48 for controlling the rotation of the head drum 12. Each servo includes a motor M and a rotation detector D both coupled to the element controlled by the servo. Associated with the reel servos 46, 47 are means 51 for sensing the beginning-of-media (BOM) and end-of-media (EOM); these means 51 may for example be based on motor current sensing, as the motor current of whichever reel is being driven to wind in tape (dependant on the direction of tape travel) will increase significantly upon stalling of the motor at BOM/EOM.

The tape deck 11 further comprises the automatic track following circuit 49 for generating ATF signals for recordal on tape during recording of data. During play-back, the ATF circuit 49 is responsive to the ATF track signal read from tape to provide an adjustment signal to the capstan servo 45 so that the heads HA, HB are properly aligned with the tracks recorded on the tape. The tape deck 11 also includes the pulse generator 50 for generating timing pulses synchronized to the rotation of the heads HA, HB.

The operation of the tape deck 11 is controlled by a deck controller 52 which is connected to the servos 45 to 48 and to the BOM/EOM sensing means 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos.

The deck controller (52) is itself governed by control signals issued by the system controller 43.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F. RWD). The deck controller 52 is arranged to report arrival of BOM or EOM back to the system controller 43.

From the foregoing description, it can be seen that aggregated tape-usage data relating to both Partitions 1 and 0 is:
  (a) first read off into monitor 68 from the system log area 82 of Partition 1 when a tape is first loaded;
  (b) thereafter updated in monitor 68 during the current usage session in respect of tape usage in both Partition 1 and Partition 0; and (c) finally recorded back to the system log area 82 of Partition 1 immediately prior to unloading of the tape.

In addition, tape-usage data relating to Partition 0 is:
(a) read off into monitor 68 from the system log area 82 of Partition 0 when the Partition is first accessed during a tape usage session;
(b) thereafter updated in monitor 68 in respect of usage relevant to Partition 0;
(c) recorded back to the system log area 82 of Partition 0 immediately prior to unloading of the tape.

Step (c) could be modified by arranging for the tape usage data relating to Partition 0 to be recorded back to the system log are 82 of Partition 0 upon exiting of this Partition.

The system controller 43 is arranged to service requests from the host computer for tape usage information. A request for aggregated tape usage information can be immediately serviced by the controller 43 by accessing the data held in the monitor 68.

A request from the computer for usage data relevant to Partition 0 will either be immediately serviced by the controller 43 by accessing the monitor 68 or where the information has not yet been read from tape, by first controlling the reading of the required information from the system area 82 of Partition 0.

As regards a request for tape-usage information relevant only to Partition 1 while this information is not directly available (the system log area 82 of Partition 1 contains aggregated data), the information can be obtained by subtracting the usage data relevant to Partition 0 from the aggregated usage data. For this purpose, the system controller is provided with a tape-usage interpreter 90 operative upon receipt of a request for Partition 1 usage data, to access the data held in the monitor 68 and to effect the necessary processing to derive Partition 1 usage.

In the event that such a request is received before the tape-usage data relevant to Partition 0 has been read, then the controller 4 first controls the reading off of the required data from the system area 82 of Partition 0.

The provision of aggregated data in the system log area 82 of the first Partition 1 enables rapid access to this information while still permitting recovery of tape-usage information relevant to each Partition in isolation. The storage of aggregated data in the first Partition can, of course, also be carried out where the tape is divided into three or more Partitions. Where more than two Partitions are provided several different schemes become feasible for storing tape-usage data in the Partitions following the first Partition such as to enable recovery of tape-usage information relevant to each Partition in isolation.

According to one scheme, the system log area 82 of each Partition other than the first, stores tape-usage data relevant only to the Partition of which it forms a part. In this case, tape-usage data relevant only to the first Partition can be obtained by subtracting from the aggregated data the data stored (or intended to be stored where held in monitor 68) in each of all the remaining Partitions.

According to another scheme, the system log area 82 of each Partition other than the first, stores tape-usage data relevant to the Partition of which it forms a part and to all downstream Partitions if any. In this case, tape-usage data relevant to any particular Partition can be obtained by subtracting from the tape-usage data stored (or intended to be stored) in that Partition, tape-usage data stored (or intended to be stored) in the adjacent downstream Partition, if any.

With the first of the above two schemes, it is preferred to update the system log area of a Partition, other than the first, upon leaving a Partition as this means that only the system log area of the first Partition need be updated upon unloading of the tape. However, for the second scheme it is preferred to leave updating of all log areas until unloading of the tape.

The concept of storing aggregated tape-usage data in the system log area of the first Partition in place of Partition-specific tape-usage data, has been described above in connection with helical scan tape recording. It will, however, be appreciated by persons skilled in the art that the concept is equally applicable where longitudinal recording techniques are used.

Although particular embodiments of the invention have been shown and described and others suggested, it will be understood that other embodiments will occur to those of ordinary skill in the art which will fall within the true spirit and scope of the appended claims.

What is claimed:

1. Data storage apparatus for storing data on a tape medium, said apparatus comprising:
   recording means for recording said data on a tape medium in accordance with a predetermined format, said format specifying a plurality of recording sections arranged one after another along the tape medium and including both a log area for storing tape-usage information and a data area for storing said data, the recording means being operative to record the accumulated tape-usage information in the said log areas associated with the said tape sections;
   control means operative to cause the recording means to record data in at least two different longitudinally spaced sections of the tape medium with data recordal in each section being respectively effected in accordance with said format;
   a tape-usage monitor operative to accumulate tape-usage information relating to data recordal on the tape medium, the form of said accumulated-tape usage information being such as to enable tape-usage information relating to each said tape section to be derived therefrom;
   said accumulated tape-usage information including aggregated data formed by aggregating tape-usage information across all said tape sections;
   said recording means being operative to record the aggregated data in the said log area of the first said tape section encountered from the beginning of the tape.

2. Data storage apparatus according to claim 1, wherein said accumulated tape-usage information comprises, in addition to said aggregated data, respective section-usage data relating specifically to at least one tape section downstream of said first section, the recording means being operative to record the section-usage data relating to said downstream section in the said log area of that tape section.

3. Data storage apparatus according to claim 1, wherein said accumulated tape-usage information comprises, in addition to said aggregated data, respective sub-total data associated with at least one tape section, downstream of said first section said data being formed for said at least one section by aggregating the tape usage information relating to said at least on section with tape usage information of at least another downstream tape section, the recording means being operative to record the sub-total data associated with said at least one tape section in the said log area of at least one tape section.

4. Data storage apparatus according to claim 2 further comprising readback means for reading back data and tape-usage information recorded on said medium in accordance with said predetermined format, said control means being operative to control the readback means to read back data and tape usage information from each said section of the tape as required, and further comprising a tape-usage interpreter operative to receive tape-usage information read back from the tape medium by the readback means and to derive therefrom tape-usage information relating specifically to each said tape section, including said first section.

5. Data storage apparatus according to claim 4 wherein the tape-usage interpreter is operative to derive tape-usage information relating specifically to said first section by subtracting from said aggregated data the section usage data readback from at least one section downstream of said first section.

6. Data storage apparatus according to claim 3 further comprising readback means for reading back data and tape-usage information recorded on said medium in accordance with said predetermined format, said control means being operative to control the readback mean to read back data and tape usage information from each said section of the tape as required, and further comprising a tape-usage interpreter operative to receive tape-usage information read back from the tape medium by the readback means and to derive therefrom tape-usage information relating specifically to each said tape section including said firs section.

7. Data storage apparatus according to claim 6 wherein the tape-usage interpreter is operative to derive tape-usage information relating to a particular tape section by subtracting from the tape-usage data readback for said particular section, the tape-usage data readback from the immediately following tape section.

8. A method of storing data on a tape medium in a first section and a second section arranged along the tape medium, said method comprising the following steps:
    recording data in a first section using a format having a plurality of recording sections arranged along the tape medium including recording aggregated tape-usage information for said first section and said second section in a log area and recording data in a data area; and
    recording data in a second section using a format having a plurality of recording areas arranged along the tape medium including recording tape usage information for said second section in a log area and recording data in a data area.

9. The method of claim 8 including the step of recording data in a third section using a format having a plurality of recording areas arranged along the tape medium including recording tape usage information for said third section in a log area and recording data in a data area wherein said tape usage information recorded in said log area of said first section includes the aggregate of said second section and said third section.

10. The method of claim 9 wherein said tape usage information recorded in said log area of said second section includes the aggregate of said second section and said third section.

11. The method of claim 8 including the step of monitoring the tape-usage information of the tape medium in the first section and the second section before recording the aggregated tape-usage information.

* * * * *

UNITED STATES PATENT AND TRADEMARK OFFICE
CERTIFICATE OF CORRECTION

PATENT NO. : 5,081,548

DATED : January 14, 1992

INVENTOR(S) : Yoshizumi Inazawa and Brian A. Milthorp

It is certified that error appears in the above-identified patent and that said Letters Patent is hereby corrected as shown below:

Column 1, line 26, before "Digital" insert --"--

Column 7, line 2, change "passe" to --passes--

Column 11, line 40 change "4" to --43--

Column 13, line 34 change "firs" to --first--

Signed and Sealed this

Third Day of August, 1993

Attest:

MICHAEL K. KIRK

Attesting Officer     Acting Commissioner of Patents and Trademarks